US006976776B2

(12) United States Patent
Kakidaira et al.

(10) Patent No.: US 6,976,776 B2
(45) Date of Patent: Dec. 20, 2005

(54) BULB INSERTION STRUCTURE OF VEHICULAR LAMP

(75) Inventors: Susumu Kakidaira, Shizuoka (JP); Takaaki Miyazaki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 128 days.

(21) Appl. No.: 10/630,554

(22) Filed: Jul. 30, 2003

(65) Prior Publication Data

US 2004/0032746 A1 Feb. 19, 2004

(30) Foreign Application Priority Data

Aug. 19, 2002 (JP) .......................... P.2002-238362

(51) Int. Cl.7 ................................................ B60Q 1/00
(52) U.S. Cl. ...................... 362/548; 362/652; 362/648; 362/657; 362/649; 362/519
(58) Field of Search ................................ 362/519, 548, 362/652, 648, 657, 649, 226; 439/311, 314, 439/318; 429/311, 314, 318

(56) References Cited

U.S. PATENT DOCUMENTS

| | | | | |
|---|---|---|---|---|
| 2,110,135 A * | 3/1938 | Douglas | 362/226 |
| 2,237,956 A * | 4/1941 | Arras | 439/313 |
| 3,302,195 A * | 1/1967 | Fuller | 340/815.51 |
| 4,513,356 A * | 4/1985 | Mikola | 362/226 |
| 4,764,854 A * | 8/1988 | Matsune et al. | 362/649 |
| 5,186,535 A * | 2/1993 | Yokoyama | 362/649 |
| 5,402,325 A * | 3/1995 | Wisler et al. | 362/548 |
| 6,226,068 B1 * | 5/2001 | Arcykiewicz et al. | 439/314 |
| 2001/0015897 A1 * | 8/2001 | Aida et al. | 362/519 |

FOREIGN PATENT DOCUMENTS

JP 9-219103 8/1997

* cited by examiner

*Primary Examiner*—Stephen Husar
*Assistant Examiner*—Anabel Ton
(74) *Attorney, Agent, or Firm*—Fish & Richardson P.C.

(57) ABSTRACT

Systems and techniques are described to provide a bulb insertion structure of a vehicular lamp which allows bulb replacement and accurate positioning of a bulb with respect to a reflector. In general, in one implementation, a bulb insertion structure of a vehicular lamp includes a plurality of fixing protrusions formed on an outer periphery of a rear end portion of a cylindrical socket fixture fixed in a bulb insertion hole of a reflector; a plurality of engaging protrusions formed on an outer periphery of a focus ring provided on a bulb and corresponding to the fixing protrusions; and a cup-shaped socket covering the outer periphery of the socket fixture from the rear, the socket incorporating a spring for pressing forward the rear end portion of the accommodated bulb, and having an outer peripheral wall provided with, at multiple locations corresponding to the fixing protrusions, an engaging notch (J-slot) for holding the engaging protrusion and the fixing protrusion overlapped together. In this structure, the J-slot is provided with an engaging recess portion for holding the engaging protrusion in the J-slot when the socket is pulled out from the socket fixture. Furthermore, a slit, which extends continuously from the engaging recess portion of the J-slot in a circumferential direction, is formed of a size that allows the engaging protrusion and the fixing protrusion to only pass therethrough separately.

11 Claims, 7 Drawing Sheets

BULB INSERTION STRUCTURE OF VEHICULAR LAMP

BACKGROUND

The following description relates to techniques and methods for inserting a bulb into a vehicular lamp.

A conventional bulb insertion structure of a vehicular lamp (Japanese Patent Laid-Open Publication No. 9-219103), as shown in FIGS. 8 and 9, is constituted by a cylindrical socket fixture 2 fixed to a bulb insertion hole 1*a* of a reflector 1, and a cup-shaped socket 6 which can accommodate therein a rear end portion of a bulb 4 and covers an outer periphery of the socket fixture 2 from the rear. The socket fixture 2 and the bulb 4 are provided with three fixing protrusions 2*a* and three engaging protrusions 5*a* that respectively correspond, and the outer periphery of the socket 6 is provided with three J-shaped slots (hereafter referred to as "J-slot") 7 at positions corresponding to the protrusions 2*a* and 5*a*. Furthermore, a spring 8 for energizing the bulb 4 forward is provided in an inner portion of the socket 6 in which the rear end portion of the bulb 4 can be accommodated.

To insert the bulb 4 into the bulb insertion hole 1*a*, as indicated by an arrow A in FIG. 9, the bulb 4 is inserted in the socket fixture 2 to conform the engaging protrusion 5*a* with the fixing protrusion 2*a*. Next, as indicated by an arrow B in FIG. 9, the socket 6 covers the socket fixture 2 such that the J-slot 7 aligns with both protrusions 5*a* and 2*a*. Then, when the socket 6 is pushed forward against the energizing force of the spring 8 and rotated clockwise, the fixing protrusion 2*a* and the engaging protrusion 5*a* engage with the J-slot 7. As a result, the socket 6 is fixed to the socket fixture 2, creating a state where the bulb 4 is inserted into the bulb insertion hole 1*a* as shown in FIG. 8.

Furthermore, the J-slot 7 is provided with an engaging recess portion 7*a* for holding the engaging protrusion 2*a* when the socket 6 is pulled out, so that the socket 6 can be detachably attached with the bulb 4 in an integrated state.

That is by covering the socket fixture 2 with the socket 6 integrated with the bulb 4 by engaging the engaging protrusion 5*a* with the J-slot 7 such that the J-slot 7 conforms with the fixing protrusion 2*a*, in addition to pushing the socket 6 against the energizing force of the spring 8 and rotating the socket 6 clockwise, the fixing protrusion 2*a* and the engaging protrusion 5*a* engage with the J-slot 7. Consequently, the bulb 4 is inserted into the bulb 4 insertion hole as shown in FIG. 8.

Furthermore, to pull the bulb 4 out from the bulb insertion hole 1*a*, the engaging protrusion 5*a* engages with the engaging recess portion 7*a*, and (a protrusion-sliding slit 7*b* of) the J-slot 7 opens when the socket 6 is pushed in against the energizing force of the spring 8. Therefore, by rotating the socket 6, the fixing protrusion 2*a* slides along the slit 7*b*, disengaging the fixing protrusion 2*a* and the J-slot 7, and thus the socket 6 integrated with the bulb 4 can be pulled out from the socket fixture 2.

However, in the conventional structure described above, cases occur in which the socket 6 is fitted in an incomplete form when fitting the socket 6 integrated with the bulb 4 to the socket fixture 2.

As shown in FIG. 10A, the bulb 4 and the socket 6 may be integrated in a manner such that the engaging protrusion 5*a* on the bulb side abuts the protrusion-sliding slit 7*b* of the J-slot 7. When the socket 6 integrated with the bulb 4 is fitted to the socket fixture 2, the socket 6 is pressed and rotated as shown in FIG. 10A and by arrows A1 and A2 in FIG. 10B, and the engaging protrusion 5*a* and the socket 6 integrally rotate with respect to the fixing protrusion 2*a* as shown in FIG. 10B. The engaging protrusion 5*a* may not slide with respect to the J-slot 7, and only the fixing protrusion 2*a* slides as indicated by an imaginary line in FIG. 10B. Then, as shown in FIG. 10C, the fixing protrusion 2*a* engages with the J-slot 7, however, the engagement between the engaging protrusion 5*a* on the bulb side and the J-slot 7 is maintained in an incomplete state.

SUMMARY

In one aspect, the bulb insertion structure includes a plurality of tongue-like fixing protrusions formed on an outer periphery of a rear end portion of a cylindrical socket fixture fixed in a bulb insertion hole of a reflector; a plurality of engaging protrusions formed on an outer periphery of a focus ring provided on a bulb and corresponding to the fixing protrusions; and a cup-shaped socket covering the outer periphery of the socket fixture from the rear, the socket incorporating a spring for pressing forward the rear end portion of the accommodated bulb and having an outer peripheral wall provided with, at multiple locations corresponding to the fixing protrusions, an engaging notch which holds the engaging protrusion and the fixing protrusion overlapped together. The engaging notch is provided with an engaging recess portion for holding the engaging protrusion in the engaging notch when the socket is pulled out from the socket fixture. A slit, which extends continuously from the engaging recess portion of the engaging notch in a circumferential direction, is formed of a size that allows the engaging protrusion and the fixing protrusion to only pass therethrough separately.

The systems and techniques described here may provide one or more of the following advantages. In some implementations, the bulb insertion structure of a vehicular lamp allows bulb replacement and accurate positioning of a bulb with respect to a lamp reflector.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

DETAILED DESCRIPTION

The present disclosure relates to a bulb insertion structure of a vehicular lamp in which a socket, an outer periphery of which is provided with an engaging notch for holding a fixing protrusion on a socket fixture side and an engaging protrusion on a bulb side in an overlapped state, is fitted to a socket fixture fixed into a bulb insertion hole of a reflector, and more particularly to a bulb insertion structure in which an engaging recess portion for holding the engaging protrusion is provided in the engaging notch, and a socket integrated with a bulb can be detachably attached to the socket fixture.

Figure 5A:
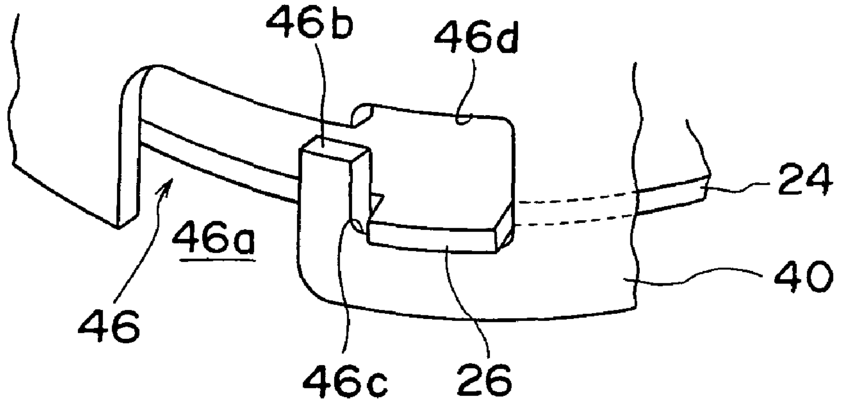
FIGS. 5A–5C are perspective views illustrating movement of an engaging protrusion and a fixing protrusion in an engaging notch when a bulb is inserted or removed.

To insert the bulb into the bulb insertion hole, the engaging protrusion of a focus ring is first engaged with the engaging notch so as to integrate the bulb with the socket. Then, the socket covers the socket fixture from the rear such that the fixing protrusion aligns with the engaging notch, and the socket is pressed forward against the energizing force of the spring. In this case, if the engaging protrusion is appropriately engaged with the protrusion latching portion in the engaging notch as shown in FIG. 5A, the engaging protrusion of the focus ring engages with the engaging recess portion in the engaging notch, and the fixing protrusion of the socket fixture comes to a position that aligns with the protrusion-sliding slit. In this case, if the socket is rotated in a direction of engagement of the fixing protrusion and the engaging notch, the engaging notch slides along the fixing protrusion, and the fixing protrusion overlaps the engaging protrusion and comes to a position that aligns with the protrusion latching portion in the engaging notch. In this case, if the pressing force applied to the socket is released, the overlapping fixing protrusion and engaging protrusion are held engaged with (the protrusion latching portion of) the engaging notch by the energizing force of the spring. That is, the bulb is inserted into the bulb insertion hole.

To remove the bulb from the bulb insertion hole, if the socket is pressed forward against the energizing force of the spring, in a state where the overlapping fixing protrusion and engaging protrusion are held in (the protrusion latching portion of) the engaging notch, the engaging protrusion of the focus ring engages with the engaging recess portion in the engaging notch, and the fixing protrusion of the socket fixture comes to a position that aligns with the slit extending in a circumferential direction. In this case, if the socket is rotated in a direction of disengagement of the fixing protrusion and the engaging notch, the engaging notch holding the engaging protrusion in the engaging recess portion slides along the fixing protrusion (the fixing protrusion of the socket fixture and the engaging protrusion of the focus ring slide relatively), and the fixing protrusion comes to a position that aligns with the opening portion of the engaging notch. In this case, if the pressing force applied to the socket is released, a reactive force of the energizing force of the spring pushes the socket out of the socket fixture.

Figure 6A:
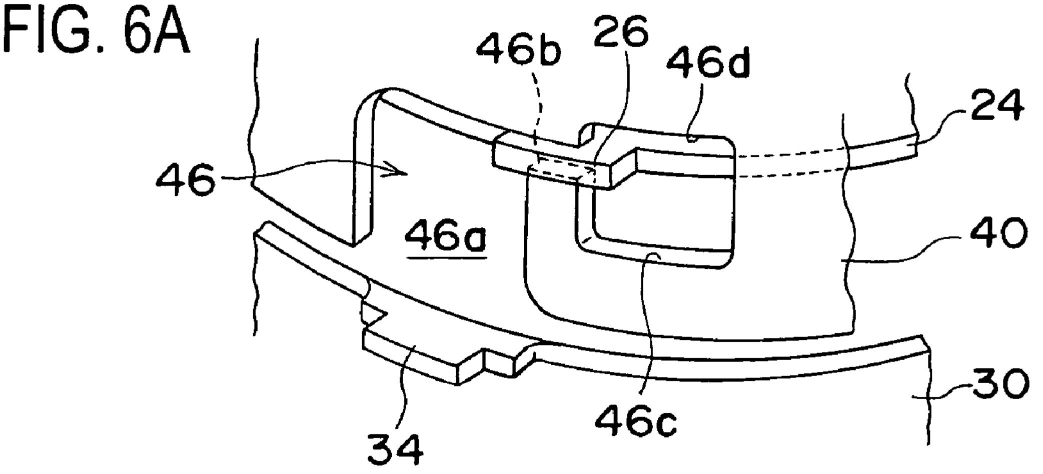
FIGS. 6A–6B a view illustrating an operation of a protrusion-sliding slit in an engaging notch when a socket integrated with the bulb is fitted to a socket fixture in a state where engagement between the engaging protrusion and the engaging notch is incomplete.

When inserting the bulb into the bulb insertion hole, if the bulb is not appropriately integrated with the socket as shown in FIG. 6A, for example, if the engaging protrusion is not correctly engaged with the protrusion latching portion in the engaging notch as in a case where the engaging protrusion is within the slit extending in the circumferential direction in the engaging notch, an incomplete attachment state is created in the conventional structure, in which only the fixing protrusion is engaged with the protrusion latching portion in the engaging notch.

The slit extending in the circumferential direction in the engaging notch is formed of a size that allows the engaging protrusion and the fixing protrusion only to pass therethrough separately. Accordingly, if the engaging protrusion is not correctly engaged with the protrusion latching portion in the engaging notch, such as when, for example, the engaging protrusion is within the slit in the engaging notch, the fixing protrusion can not come to a position that aligns with the slit (the fixing protrusion can not enter the slit in the engaging notch). Thus, the socket can not be rotated in the direction of engagement of the fixing protrusion and the engaging notch. Therefore, in this case, an operator who rotates the socket can recognize that the engagement between the engaging protrusion and engaging notch is incomplete. By again performing the operation to fit the socket after correctly engaging the engaging protrusion with (the protrusion latching portion in) the engaging notch and correctly integrating the bulb with the socket anew, the socket can be fixed to the socket fixture. Namely, unlike in the conventional structure, the socket does not become fixed to the socket fixture in a state where the engagement between the engaging protrusion and the engaging notch is incomplete.

In an implementation, a depth of the engaging recess portion is formed generally identical to a thickness of the engaging protrusion.

To insert or remove the bulb with respect to the bulb insertion hole (to attach or detach the socket with respect to the socket fixture), the socket is pressed forward with respect to the socket fixture against the energizing force of the spring, so as to engage the engaging protrusion of the focus ring with the engaging recess portion in the engaging notch. Hence, the fixing protrusion of the socket fixture and the slit extending in the circumferential direction in the engaging notch come to a mutually aligned positions in the circumferential direction, and the socket can be rotated in the circumferential direction of engagement or disengagement (the engaging notch can slide along the fixing protrusion).

Figure 4A:
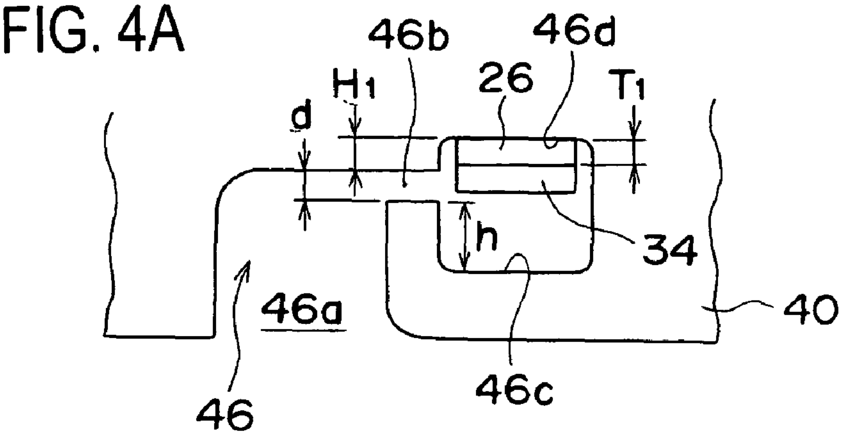
FIGS. 4A–4B are views illustrating a relation between a depth of an engaging recess portion of a J-slot and a thickness of an engaging protrusion.
Figure 4B:
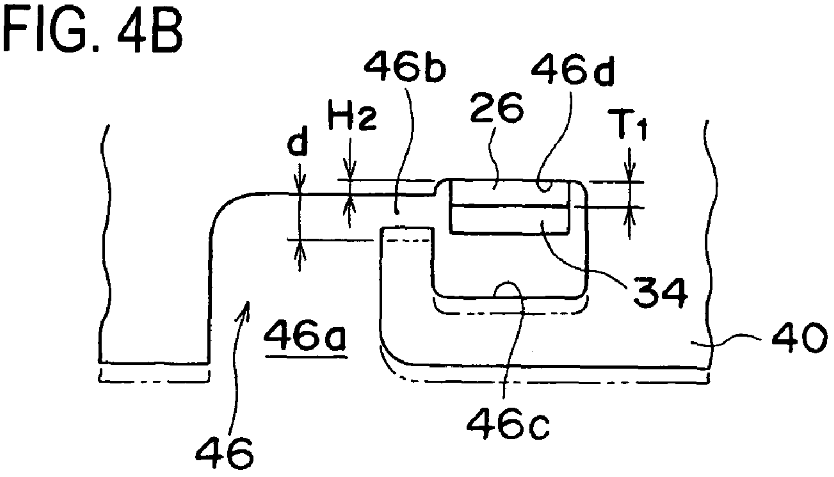

Furthermore, if a depth of the engaging recess portion is greater than a thickness of the engaging protrusion, as shown in FIG. 4A, the fixing protrusion during pressing of the socket is pushed to a position beyond a position of the slit that extends in the circumferential direction. Thus, the fixing protrusion does not align with the slit, and therefore, the socket can not be rotated smoothly. On the other hand, if the depth of the engaging recess portion is less than the thickness of the engaging protrusion, as shown in FIG. 4B, a width of the slit needs to be increased to prevent blocking of the slit by the engaging protrusion (focus ring). Accordingly, a longitudinal length of the socket is increased, thereby increasing the amount of protrusion of the socket toward the rear of the reflector.

In an implementation, the depth of the engaging recess portion is generally the same as the thickness of the engaging protrusion. If the socket is pressed forward against the energizing force of the spring, the engaging protrusion engaged with the engaging recess portion becomes substantially flush with a periphery portion of the slit. Therefore, the fixing protrusion and the slit align in the circumferential direction, and thus the socket can be rotated smoothly (the engaging notch can slide along the fixing protrusion).

In an implementation, both a cap of the bulb provided with the focus ring and the socket are made of metal, and the socket is integrally covered with a detachable socket cover made of synthetic resin, an outer periphery of which is provided with a protrusion for a fingerhold.

Although the socket integrated with the bulb may become hot due to heat generated by the bulb, an operator can attach (insert) or detach the socket (bulb) without incurring a burn injury by holding the socket cover made of synthetic resin, which integrally covers the bulb, has low heat conductivity, and is easy to hold.

Figure 1:
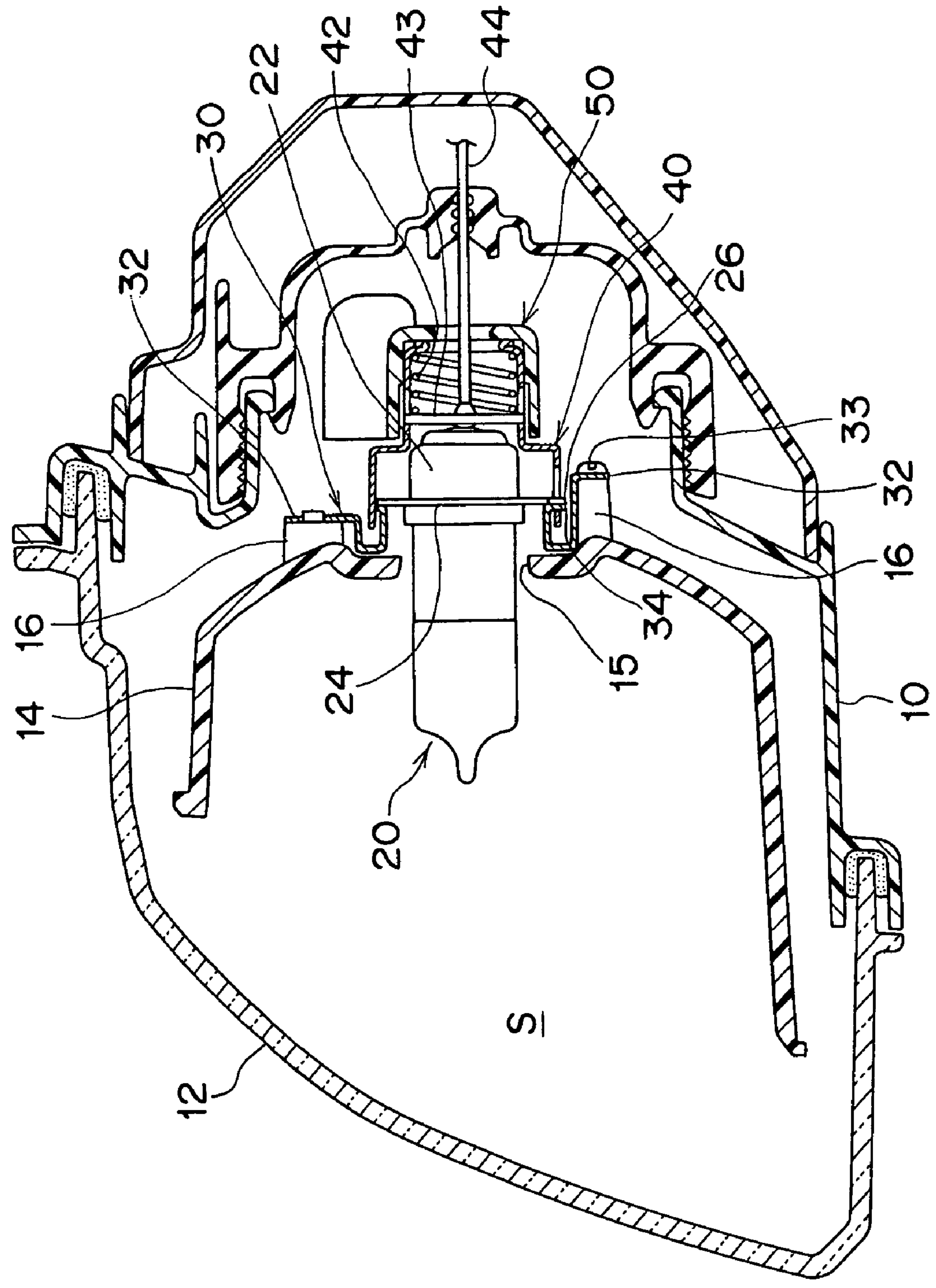
FIG. 1 is a longitudinal cross-sectional view of a headlamp for a motorcycle.

FIG. 1 is an illustrative vehicular lamp having a container-like lamp body 10, a front side of which is open. A front opening portion of the lamp body 10 is assembled with a front lens 12, defining a lamp chamber S. An aluminum reflector 14, which is fixed to the lamp body 10 by fixing means (not shown), is accommodated in the lamp chamber S. A bulb 20 as a light source is inserted, via a metal socket fixture 30 and a metal socket 40, into a bulb insertion hole 15 provided at a rear top portion of the reflector 14.

The socket fixture 30 has a cylindrical shape, with three bent legs 32 formed on an outer periphery of a front end portion thereof. These legs 32 are fixed, by screws 33, to bosses 16 erected on a peripheral portion of the bulb insertion hole 15 so as to be integrated with the reflector 14. An outer periphery of a rear end portion of the socket fixture 30 is formed with three tongue-like fixing protrusions 34 at predetermined intervals in a circumferential direction.

Figure 2:
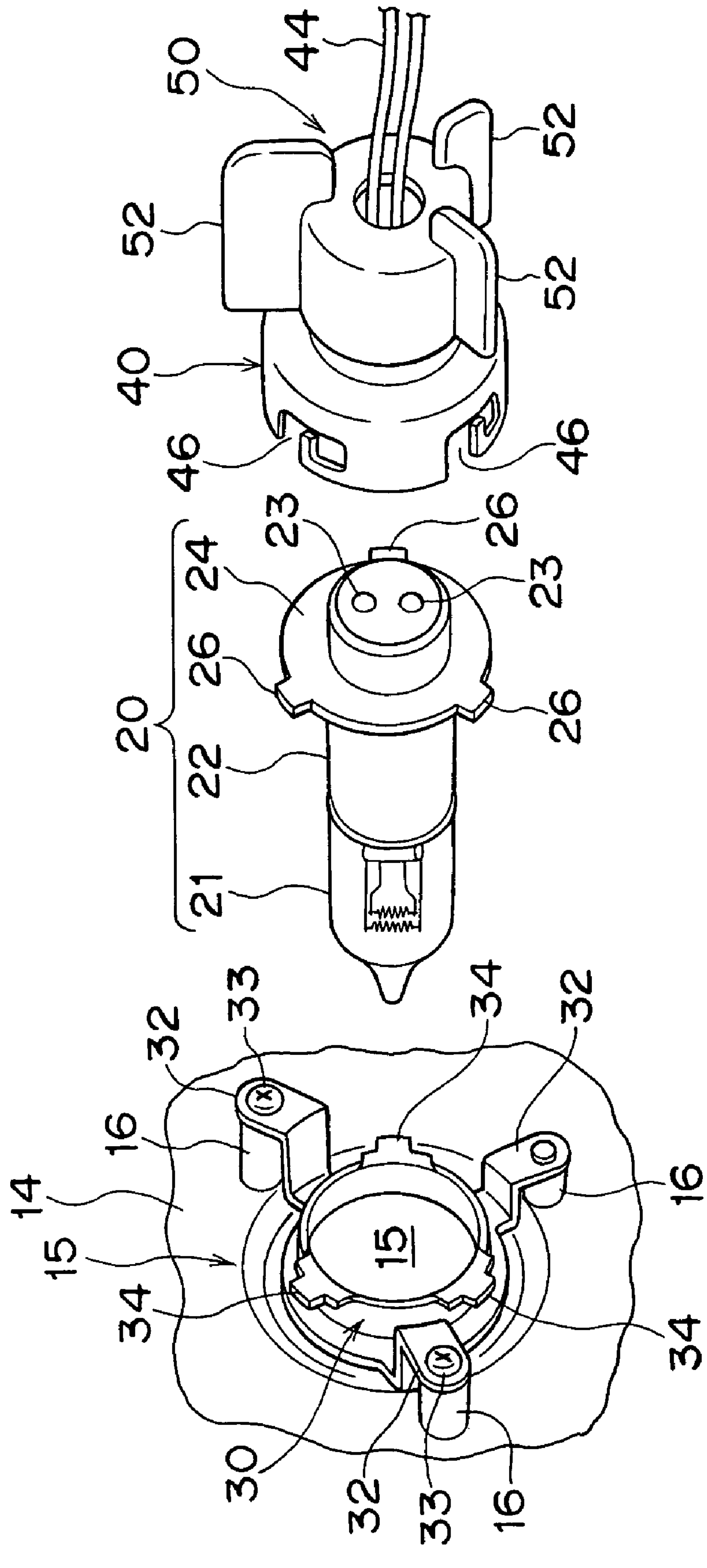
FIG. 2 is an exploded perspective view around a bulb insertion hole of the headlamp of FIG. 1.

Referring to FIG. 2, the bulb 20 is constructed such that a metal cap 22 is integrated with a base end portion of a glass bulb 21 incorporating a filament. A connecting terminal 23 is exposed at a rear end portion of the bulb 20. Furthermore, an outer periphery of the cap 22 is provided with a metal focus ring 24, and three tongue-like engaging protrusions 26 that correspond to the fixing protrusions 34 on the socket fixture 30 side are formed on an outer periphery of the focus ring 24.

The socket 40 into which the rear end portion of the bulb 20 can be accommodated is formed in a cup shape with notches, the front side of which is open, and a compression coil spring 42 is incorporated in an inner side of the rear end portion of the socket 40, such that an energizing force of the spring 42 acts on the rear end portion of the bulb 20 via a base plate 43 (see FIG. 1) slidably attached in an axial direction. A power cord 44 that may be connected to a contact terminal 23 of the base plate 43 and lead out the rear end opening portion of the socket 40.

An outer peripheral wall of the socket 40 is formed with three J-shaped slots (hereafter referred to as "J-slot") as engaging notches that correspond to the engaging protrusions 26 on the bulb 20 side and the fixing protrusions 34 on the socket fixture 30 side. The socket 40 covers an outer periphery of the socket fixture 30 from the rear such that the engaging protrusions 34 and the fixing protrusions 26 can be held together overlapped.

Figure 3:
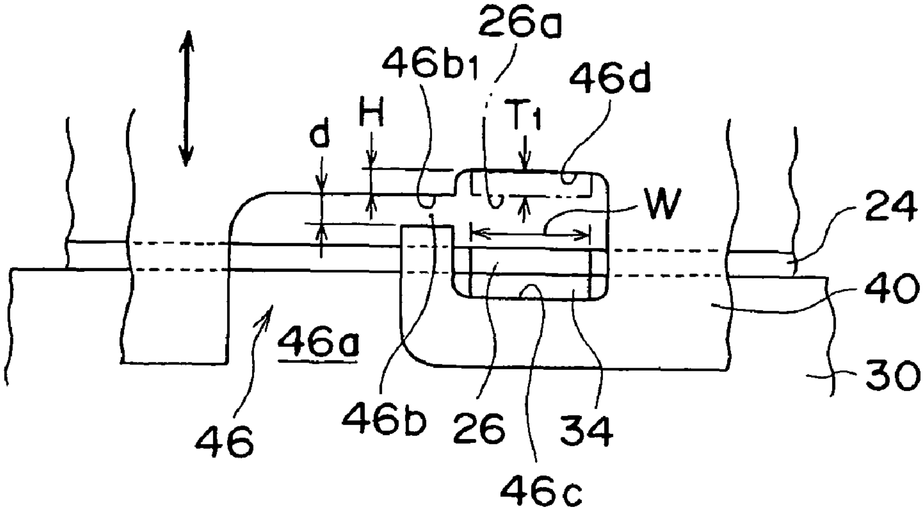
FIG. 3 is an enlarged view showing a detailed shape of a J-slot formed on a cup-shaped socket.

FIG. 3 illustrates the J-slot 46 that includes a guiding slit 46*a* extending in an axial direction on the J-slot opening side, a protrusion-sliding slit 46*b* that extends in a circumferential direction and corresponds to a J-shaped crossbar portion, a protrusion latching portion 46*c* for retaining the engaging protrusion 26 and the fixing protrusion 34, and an engaging recess portion 46*d* for engaging the engaging protrusion 26, formed at a position opposing the protrusion latching portion 46*c*. Respective widths of the guiding slit 46*a*, the latching portion 46*c*, and the engaging recess portion 46*c* are formed of a size that conforms to a width W of the engaging protrusion 26 and the fixing protrusion 34.

Referring to FIG. 4A, a depth h of the latching portion 46*c* may be formed of a size so that the engaging protrusion 26 and the fixing protrusion 34 can be engaged and held together overlapped. The engaging recess portion 46*d* may be of a size that can accommodate the engaging protrusion 26, and in particular, a depth H thereof (refer to FIG. 3) conforms to a thickness T1 of the engaging protrusion 26. Thus, as the engaging protrusion 26 engages with the engaging recess portion 46*d*, a periphery 46*b*1 of the protrusion-sliding slit 46*b* on the engaging recess portion 46*d* side becomes substantially flush with a front face 26*a* of the engaging protrusion 26. Accordingly, the fixing protrusion 34 can slide smoothly into the protrusion-sliding slit 46*b*, enabling smooth rotation of the socket 40 in the circumferential direction.

That is, if a depth H1 of the engaging recess portion 46*d* is greater than the thickness T1 of the engaging protrusion 26, as shown in FIG. 4A, the fixing protrusion 34 during pressing of the socket 40 is pushed to a position beyond a position of the protrusion-sliding slit 46*b*. Thus, the fixing protrusion 34 does not align with the protrusion-sliding slit 46*c*, and therefore, the socket 40 can not be rotated smoothly. On the other hand, if a depth H2 of the engaging recess portion 46*d* is less than the thickness T1 of the engaging protrusion 26, as shown in FIG. 4B, a width d2 of the protrusion-sliding slit 46*b* needs to be increased to prevent blocking of the slit by the engaging protrusion 26 (focus ring 24). Accordingly, as indicated by an imaginary line in FIG. 4B, a longitudinal length of the socket 40 is increased, thereby increasing the amount of protrusion of the socket 40 toward the rear of the reflector 14. Therefore, the structure according to the present embodiment is such that the engaging recess portion 46*d* conforms to the thickness T1 of the engaging protrusion 26, so that the aforementioned problems do not occur.

Furthermore, a width d of the protrusion-sliding slit 46*b* (refer to FIG. 3) is formed of a size that allows the engaging protrusion 34 and the fixing protrusion 26 to only pass therethrough separately. In an implementation, the thickness of the engaging protrusion 34 is 0.8 mm, the thickness of the fixing protrusion 26 is 0.6 mm, and the width of the protrusion-sliding slit 46*b* is 1.2 mm. The dimensions are selected to prevent the socket 40 being fitted to the socket fixture 30 with the engaging protrusion 34 in an incomplete state of engagement with the J-slot. As a result, the bulb 20 can be correctly inserted into the bulb insertion hole 15 via the socket 40 and the socket fixture 30.

Figure 5B:
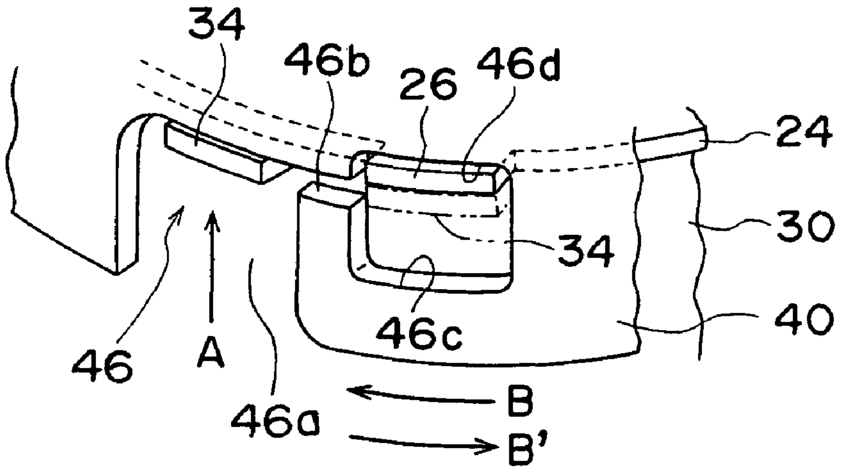

To insert the bulb 20 into the bulb insertion hole 15, the engaging protrusion 26 of the focus ring 24 is first engaged with the J-slot 46 so as to integrate the bulb 20 with the socket 40. Then, the socket 40 covers the socket fixture 30 from the rear such that the fixing protrusion 26 aligns with the J-slot 46, and the socket 40 is pressed forward against the energizing force of the spring 42. In this case, if the engaging protrusion 26 is appropriately engaged with the protrusion latching portion 46*c* in the J-slot 46 as shown in FIG. 5A, the focus ring 24 is pushed toward the front end portion of the socket fixture 30. The engaging protrusion 26 engages with the engaging recess portion 46*d* in the J-slot 46, and the fixing protrusion 34 of the socket fixture 30 comes to a position that aligns with the protrusion-sliding slit 46*b* as shown in FIG. 5B. If the socket 40 is rotated in a direction of engagement of the fixing protrusion 34 and the J-slot 46

(a direction indicated by an arrow B in FIG. 5B), the protrusion-sliding slit 46*b* of J-slot 46 slides along the fixing protrusion 34 so that the fixing protrusion 34 overlaps the engaging protrusion 26 and comes to a position (refer to an imaginary line shown in FIG. 5B) that aligns with the protrusion latching portion 46*c* in the J-slot. In this case, if the pressing force applied to the socket 40 is released, the overlapping fixing protrusion 34 and engaging protrusion 26 are held engaged with the protrusion latching portion 46*c* by the energizing force of the spring 42 (refer to FIG. 5C). That is, the bulb 20 is inserted into the bulb insertion hole 15.

Figure 5C:
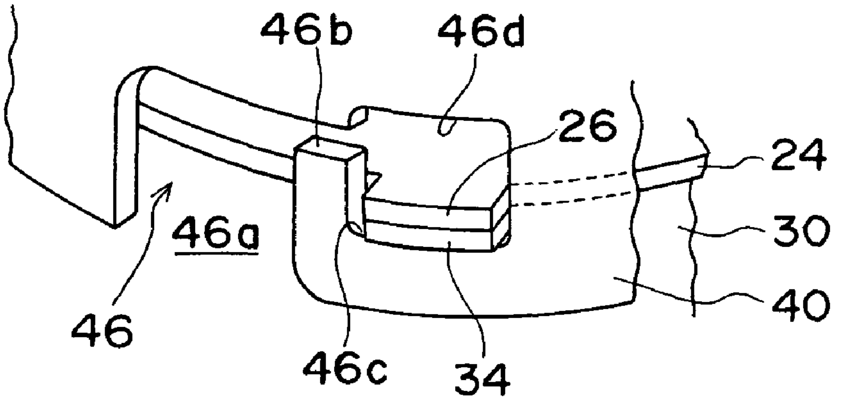

To remove the bulb 20 from the bulb insertion hole 15, if the socket 40 is pressed forward against the energizing force of the spring 42 in a state where the overlapping fixing protrusion 34 and engaging protrusion 26 are held in the protrusion latching portion 46*c* of the J-slot 46 as shown in FIG. 5C, the engaging protrusion 26, and the fixing protrusion 34 come to a position engaged with the engaging recess portion 46*d* that aligns with the protrusion-sliding slit 46*b* (refer to the imaginary lines in FIG. 5B). If the socket 40 is rotated in a direction of disengagement of the fixing protrusion 34 and the J-slot 46 (a direction indicated by an arrow B' in FIG. 5B), the J-slot 46 holding the engaging protrusion 26 in the engaging recess portion 46*d* slides along the fixing protrusion 34 (the fixing protrusion 34 and the engaging protrusion 26 slide relatively), and the fixing protrusion 34 comes to a position that aligns with the guiding slit 46*a* of the J-slot 46. If the pressing force applied to the socket 40 is released, a reactive force of the energizing force of the spring 42 pushes the socket 40 out of the socket fixture 30.

Figure 6B:
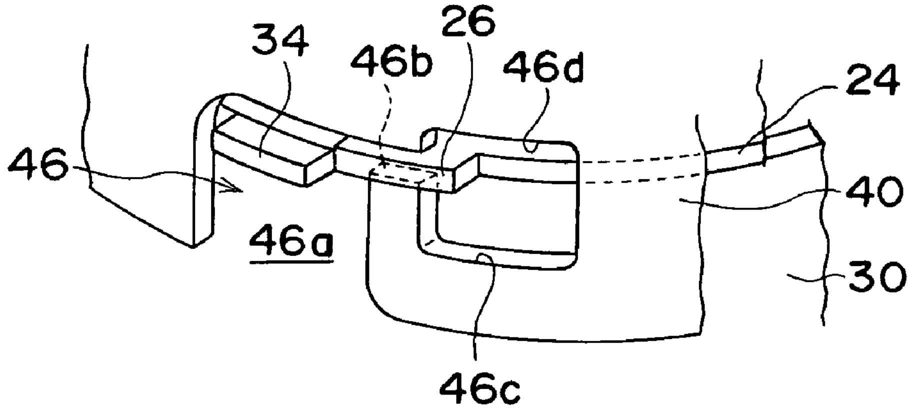
Figure 7:
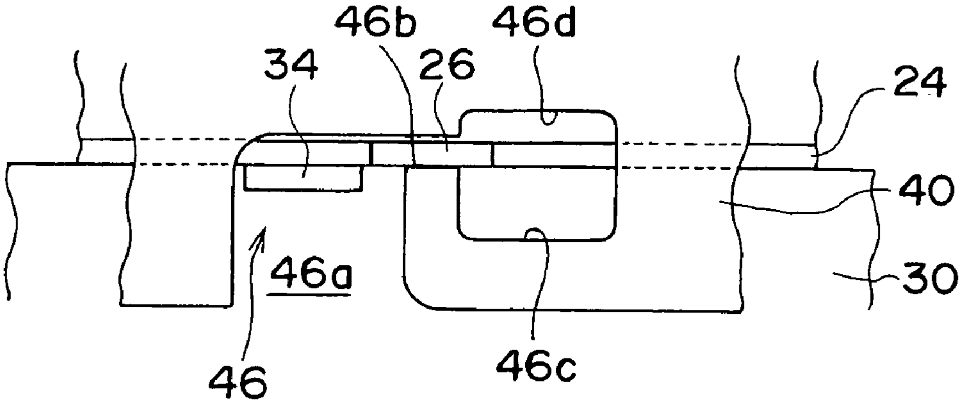
FIG. 7 is an enlarged front elevational view of the engaging notch illustrating the operation of the protrusion-sliding slit.
Figure 8:
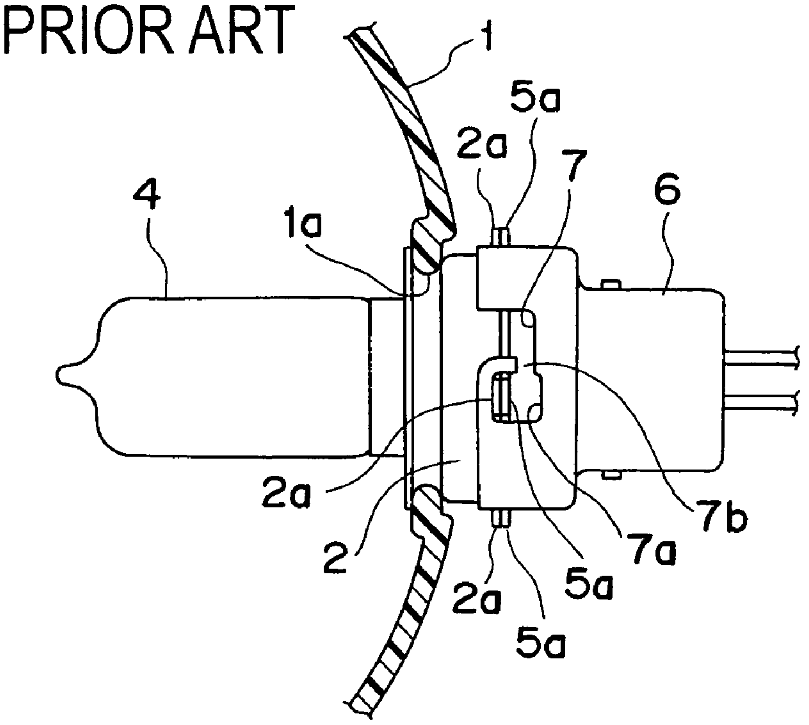
FIG. 8 PRIOR ART
FIG. 8 is a longitudinal cross-sectional view showing a conventional bulb insertion structure.
Figure 9:
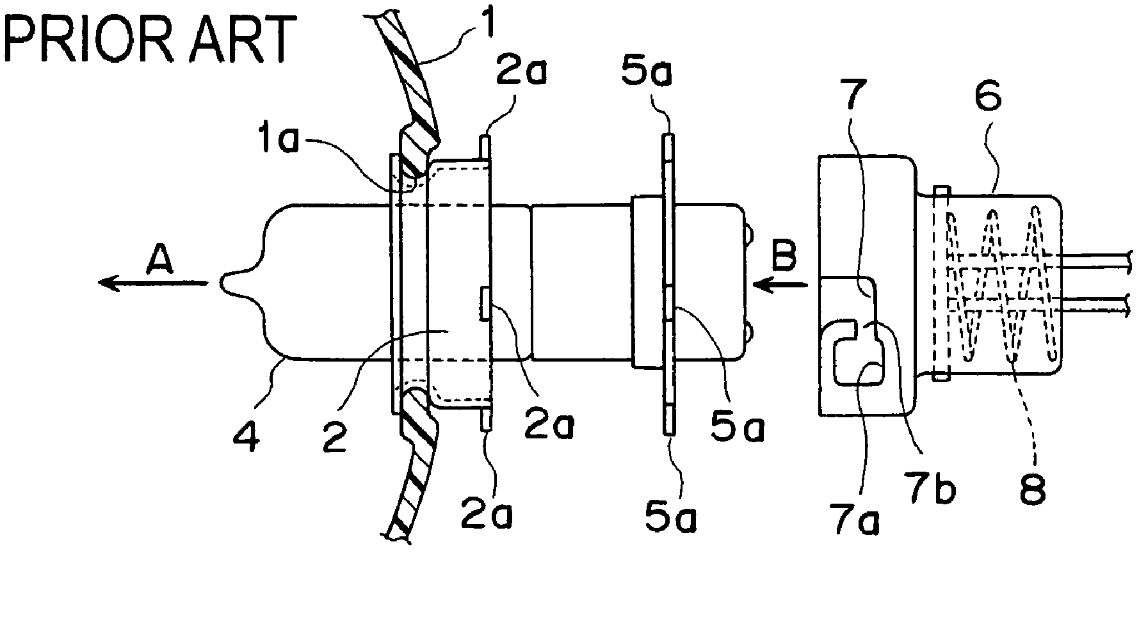
FIG. 9 PRIOR ART
FIG. 9 is an explanatory view illustrating a condition in which a bulb is inserted into a bulb insertion hole according to the conventional bulb insertion structure.
Figure 10A:
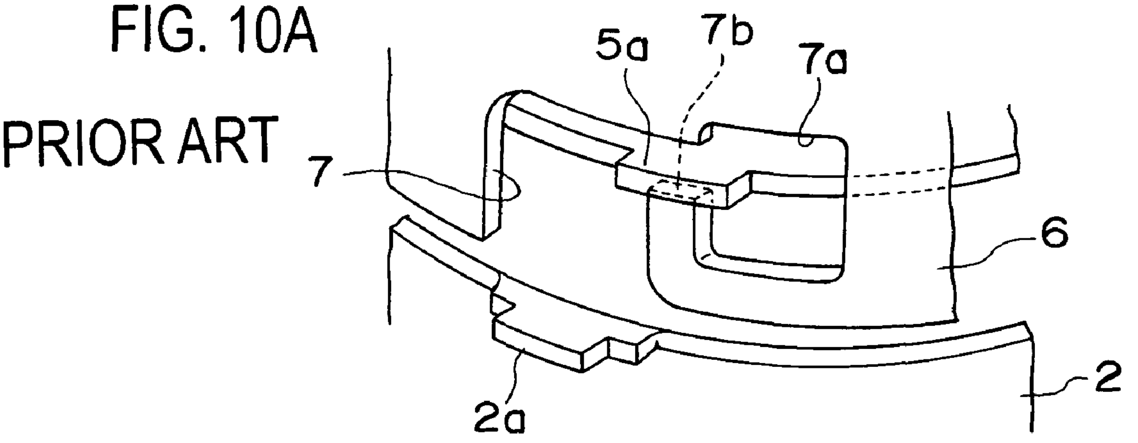
FIG. 10A PRIOR ART
FIGS. 10A–10C illustrate a condition in which a fixing protrusion is engaged with a J-slot in a state where engagement between an engaging protrusion and the J-slot is incomplete, according to a conventional bulb insertion structure. Like reference symbols in the various drawings indicate like elements.
Figure 10B:
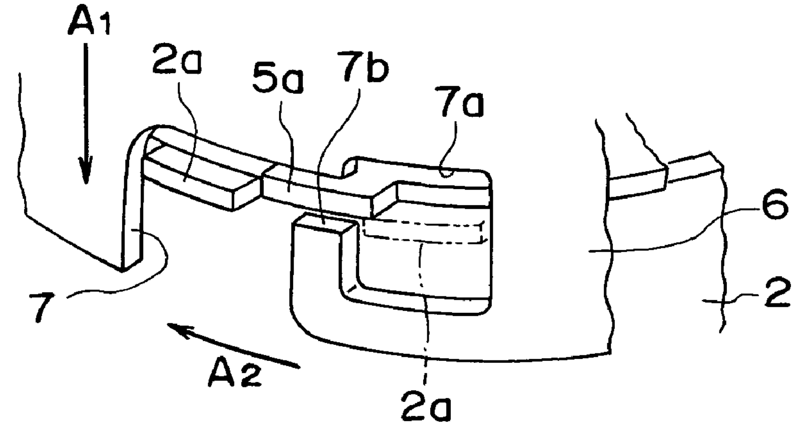
FIG. 10B PRIOR ART
Figure 10C:
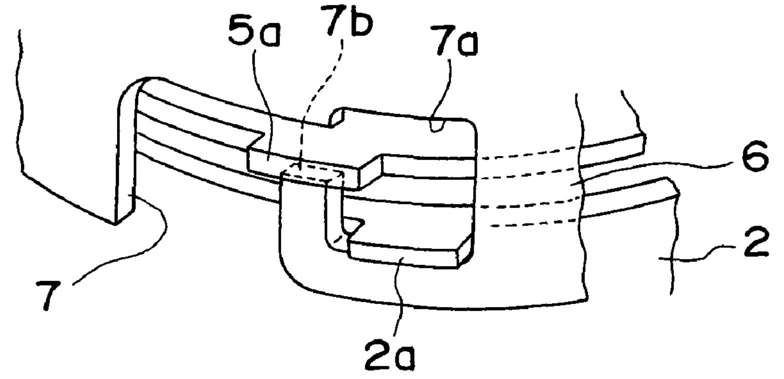
FIG. 10C PRIOR ART

FIGS. 6A–6B illustrate an arrangement where the bulb 20 is not completely integrated with the socket 40 when inserting the bulb 20 into the bulb insertion hole 15. For example, in FIG. 6A the engaging protrusion 26 is not correctly engaged with the protrusion latching portion 46*c* in the J-slot 46. The engaging protrusion 26 is within the protrusion-sliding slit 46*c* in the J-slot 46. Because the protrusion-sliding slit 46*b* in the J-slot 46 is formed of a size that allows the engaging protrusion 26 and the fixing protrusion 34 to only pass therethrough separately, the fixing protrusion 34 can not come to a position that aligns with the protrusion-sliding slit 46*b* (the fixing protrusion 34 can not enter the protrusion-sliding slit 46*b* in the J-slot 46) as shown in FIG. 6B and FIG. 7. Therefore, the socket 40 can not be rotated in the direction of engagement of the fixing protrusion 34 and the J-slot 46, and an operator can recognize that the engagement between the engaging protrusion 26 and the J-slot 46 is incomplete. By again performing the operation to fit the socket 40 after correctly engaging the engaging protrusion 26 with the protrusion latching portion 46*c* in the J-slot 46 and correctly integrating the bulb 20 with the socket 40 anew, the socket 40 can be fixed to the socket fixture 40. The socket 40 does not become fixed to the socket fixture 30 in a state where the engagement between the engaging protrusion 26 and the J-slot 46 is incomplete.

Furthermore, the outer periphery of the rear end portion of the socket 40 may be integrally covered with a detachable socket cover 50 made of synthetic resin, the outer periphery of which also may be provided with a plurality of fin-like protrusions 52 for a fingerhold. The socket 40 integrated with the bulb 20 becomes hot due to heat generated by the bulb 20, and directly holding the socket 40 by hand may cause a burn injury. Therefore, by holding the socket cover 50 that integrally covers the bulb socket 40 and does not become hot, the socket 40 (bulb) can be attached or detached without fear of a burn injury.

Furthermore, the fin-like protrusions 52 on the outer periphery of the socket cover 50 are disposed at positions that can easily be held with, for example, the thumb, index finger, and middle finger, and thus operations such as attachment and detachment can be performed smoothly by holding the socket cover 50. Therefore, even if a clearance between the lamp body 10 and a vehicle body to which the headlamp is attached is narrow, the bulb replacement work can be performed smoothly.

In addition, the socket 40 and the socket cover 50 are elastically integrated by being pressed in the axial direction, and can be separated easily by pulling both elements 40 and 50 in the axial direction.

Other embodiments may be within the scope of the following claims.

What is claimed is:

1. A bulb insertion structure of a vehicular lamp comprising:

a plurality of fixing protrusions formed on an outer periphery of a rear end portion of a cylindrical socket fixture fixed in a bulb insertion hole of a reflector;

a plurality of engaging protrusions formed on an outer periphery of a focus ring provided on a bulb and corresponding to the fixing protrusions; and a cup-shaped socket covering the outer periphery of the socket fixture from the rear, the cup-shaped socket incorporating a spring for pressing forward the rear end portion of the accommodated bulb, and having an outer peripheral wall provided with, at multiple locations corresponding to the fixing protrusions, an engaging notch for holding the engaging protrusion and the fixing protrusion overlapped together, wherein the engaging notch is provided with an engaging recess portion for holding the engaging protrusion in the engaging notch when the cup-shaped socket is pulled out from the socket fixture, characterized in that a slit, which extends continuously from the engaging recess portion of the engaging notch in a circumferential direction, is formed of a size that allows the engaging protrusion and the fixing protrusion only to pass therethrough separately.

2. The bulb insertion structure of the vehicular lamp according to claim 1, characterized in that a depth of the engaging recess portion is formed generally identical to a thickness of the engaging protrusion.

3. The bulb insertion structure of the vehicular lamp according to claim 1, characterized in that both a cap of the bulb provided with the focus ring and the socket are made of metal, and the socket is integrally covered with a detachable socket cover made of synthetic resin, an outer periphery of which is provided with a protrusion for a fingerhold.

4. The bulb insertion structure of the vehicular lamp according to claim 2, characterized in that both a cap of the bulb provided with the focus ring and the socket are made of metal, and the socket is integrally covered with a detachable socket cover made of synthetic resin, an outer periphery of which is provided with a protrusion for a fingerhold.

5. An apparatus comprising:

a cylindrical socket fixture having a plurality of fixing protrusions formed on an outer periphery of a rear end portion and fixed in position;

a focus ring having a plurality of engaging protrusions formed on an outer periphery and corresponding to the fixing protrusions, said focus ring suitable for accommodating a bulb;

a cup-shaped socket to cover the outer periphery of the socket fixture and having an outer peripheral wall provided with a plurality of engaging notches, corresponding to the fixing protrusions, to hold the fixing protrusion and the engaging protrusion overlapped together, wherein the engaging notch is characterized by a sliding slit, said sliding slit having a size that allows the fixing protrusion and the engaging protrusion only to pass therethrough separately; and a spring mounted in the cup-shaped socket to urge a rear end portion of the bulb out of the cup-shaped socket.

6. The apparatus of claim 5 wherein the engaging notch is further characterized by the sliding slit extending from a guiding slit to an engaging recess portion and a protrusion latching portion opposite the engaging recess portion.

7. The apparatus of claim 6 wherein the engaging recess portion is arranged to hold the engaging protrusion in the engaging notch when the cup-shaped socket is pulled out from the socket fixture, and wherein the protrussion latching portion is arranged to hold the engaging protrusion and the fixing protrusion in an overlapped relationship when the cup-shaped socket is coupled to the socket fixture.

8. The apparatus of claim 6 wherein the guiding slit is arranged to receive the fixing protrusion or the engaging protrusion.

9. A method comprising:

engaging at least one engaging protrusion on a periphery of a focus ring with a corresponding engaging recess portion of an engaging notch on a cup-shaped socket;

aligning at least one fixing protrusion on a periphery of a socket fixture fixed in position with a sliding slit of a corresponding engaging notch wherein the sliding slit is characterized by having a size that allows the fixing protrusion and the engaging protrusion to only pass therethrough separately;

rotating the cup-shaped socket to slide the fixing protrusion along the sliding slit and then to overlap the engaging protrusion; and urging the overlapped fixing protrusion and engaging protrusion into a protrusion latching portion opposite the engaging recess portion.

10. A method comprising:

engaging at least one engaging protrusion on a periphery of a focus ring with a corresponding protrusion latching portion of an engaging notch on a cup-shaped socket, said focus ring accommodating a bulb;

aligning at least one fixing protrusion on a periphery of a socket fixture fixed in position with a guiding slit of a corresponding engaging notch;

pressing the socket fixture forward against a force to align the fixing protrusion with a sliding slit that connects to the protrusion latching portion and the engaging protrusion engages an engaging recess portion of the engaging notch that is opposite to the protrusion latching portion, wherein the sliding slit is characterized by having a size that allows the fixing protrusion and the engaging protrusion only to pass therethrough separately;

rotating the cup-shaped socket to slide the fixing protrusion along the sliding slit and then to overlap the engaging protrusion; and releasing the force so that the overlapped fixing protrusion and fixing protrusion are engaged with with the protrusion latching portion.

11. The method of claim 10, further comprising:

pressing the socket fixture forward against the force to engage the overlapped fixing protrusion and engaging protrusion with the engaging recess portion and align the fixing protrusion with the sliding slit;

rotating the cup-shaped socket to slide the fixing protrusion along the sliding slit and then to align with the guiding slit wherein the engaging protrusion is held in the engaging recess portion; and releasing the force to push the cup-shaped socket away from the socket fixture.

* * * * *